United States Patent
Inaba et al.

[15] 3,668,377
[45] June 6, 1972

[54] NUMERICAL CONTROL SYSTEM FOR ELIMINATING PITCH ERROR AND BACKLASH OF THE FEEDING MECHANISM

[72] Inventors: Seiuemon Inaba, Kawasaki-shi; Kanryo Shimizu, Tokyo; Yoshihiro Hashimoto, Yokohama-shi, all of Japan

[73] Assignee: Fujitsu Limited, Kawasaki, Japan

[22] Filed: May 2, 1969

[21] Appl. No.: 821,260

[30] Foreign Application Priority Data

May 8, 1968 Japan..................................43/30740

[52] U.S. Cl..........................235/151.11, 318/571, 318/603, 318/660, 318/661
[51] Int. Cl. ....................................G06f 15/46, G05b 19/18
[58] Field of Search ...................235/151.11, 151.1, 151, 92; 318/20.110, 20.120, 20.130, 20.105, 20.250, 20.260, 20.310, 20.320, 20.520, 20.530, 20.730, 20.735

[56] References Cited

UNITED STATES PATENTS

| | | | |
|---|---|---|---|
| 2,950,427 | 8/1960 | Tripp | 318/19 UX |
| 3,165,680 | 1/1965 | Morrison | 318/28 |
| 3,172,026 | 3/1965 | Schuman | 318/18 X |
| 3,327,101 | 6/1967 | Evans | 318/29 X |
| 3,443,178 | 5/1969 | Reuteler | 318/28 X |
| 3,466,515 | 9/1969 | Madsen et al. | 318/18 X |
| 3,479,574 | 11/1969 | Kosem | 318/18 |

Primary Examiner—Joseph F. Ruggiero
Attorney—Curt M. Avery, Arthur E. Wilfond, Herbert L. Lerner and Daniel J. Tick

[57] ABSTRACT

A numerical control system eliminates error in a feeding mechanism for a movable machine by combining an indication of the magnitude of an input fed by the feeding mechanism to the machine with an indication of the magnitude of movement of the machine and controlling the supply of a compensating pulse to the feeding mechanism in accordance with a difference between such indications.

6 Claims, 15 Drawing Figures

NUMERICAL CONTROL SYSTEM FOR ELIMINATING PITCH ERROR AND BACKLASH OF THE FEEDING MECHANISM

DESCRIPTION OF THE INVENTION

The present invention relates to a numerical control system. More particularly, the invention relates to a numerical control system for eliminating error in a feeding mechanism for a movable machine.

In the present disclosure, a pulse motor is generally defined as an electric pulse motor and an electrohydraulic pulse motor which correctly controls the angle of rotation and rotary speed in accordance with the number and frequency of pulses in command pulse trains supplied to such motor. The pulse motor controls machines such as, for example, machine tools, profile and facsimile mechanisms and cutting and other working equipment via either open loop or closed loop systems.

Open loop systems are utilized extensively, since if the precision of only the servomechanism is assured, the numerical control device may be inexpensive and of simple structure (FIG. 8).

Numerical control devices in closed loop control systems, on the other hand, are also widely utilized, as are semi-closed loop control systems (FIGS. 9 and 10). The numerical control devices in closed and semi-closed loop control systems function with stability and permit more facile control of the machine tool. In the semi-closed loop control system, feedback signals are not provided directly from a movable part of the machine such as, for example, a table, but are derived from the amount of rotation of a servo motor or feed screw.

In a numerical control system of open loop or semi-closed loop type, even if the servomotor is capable of correctly following command pulses from the numerical control device, if there is a pitch error in the feeding mechanism which feeds the machine such as, for example, in a ball-nut screw and a pinion-rack mechanism, such error directly affects the precision of positioning of the machine. When the machine is of large size such as, for example, a machine tool of large size, the feeding mechanism for feeding the machine is particularly of large size due to the large torque transferred. It is extremely difficult to provide a feeding mechanism of large size which has high precision. Consequently, a feeding mechanism of large size frequently has a pitch error which cannot be overlooked from a practical point of view.

Various methods have been proposed for compensating for the pitch error and backlash of a feeding mechanism. In one proposed arrangement, the difference between the magnitude of an input fed to the feeding mechanism and the magnitude of the actual movement of the machine is mechanically determined. Each time the difference between the magnitudes increases or decreases by a magnitude equivalent to one command pulse, a compensating pulse is provided and is mixed with the command pulses. In such a system, however, there is a possibility that when a compensating pulse is mixed with the command pulses, a compensating pulse having a direction or polarity opposite to that required will be provided due to deflection of the machine or other defects such as, for example, the oscillation state.

The principal object of the present invention is to provide a new and improved numerical control system.

Another object of the present invention is to provide a numerical control system for eliminating error in a feeding mechanism for a movable machine.

An object of the present invention is to provide a numerical control system of open or semi-closed loop type which functions efficiently, effectively and reliably to eliminate pitch error and backlash of the feeding mechanisms.

Another object of the present invention is to provide a numerical control system of open or semi-closed loop type which functions efficiently, effectively and reliably to compensate for stability errors.

An object of the present invention is to provide a numerical control system of simple structure which eliminates error in a feeding mechanism for a machine with efficiency, effectiveness and reliability.

In accordance with the present invention, a numerical control system for eliminating error in a feeding mechanism for a movable machine comprises a numerical control device coupled to the feeding mechanism for controlling the operation thereof. A first determiner coupled to the feeding mechanism determines the magnitude of an input fed by the feeding mechanism to the machine. A second determiner coupled to the machine determines the magnitude of movement of the machine. A pulse source provides pulses at low frequency. A combiner connected to the first and second determiners combines the determinations thereof. A gate having inputs connected to the pulse source, inputs connected to the combiner and outputs connected to the numerical control device, supplies a pulse from the pulse source to the numerical control device in accordance with the determinations of the first and second determiners.

The numerical control device includes positive compensation means for compensating the feeding mechanism in one direction and negative compensation means for compensating the feeding mechanism in the opposite direction. The combiner comprises means for determining the difference between the magnitude of the input to the machine and the magnitude of movement of the machine and indicating which is greater. The combiner controls the gate to supply a pulse to the positive compensation means of the numerical control device when one of the magnitudes is greater than the other and to the negative compensation means of the numerical control device when the other of the magnitudes is greater than the one of the magnitudes.

The magnitude determined by each of the first and second determiners includes direction. The combiner may comprise a reversible counter and the gate may comprise a coincidence gate. In another embodiment, the first determiner may comprise resolver means, the second determiner may comprise linear inductosyn means, the combiner may comprise a phase detector and the gate may comprise bistable multivibrator means.

In order that the present invention may be readily carried into effect, it will now be described with reference to the accompanying drawings, wherein.

In the figures, the same components are identified by the same reference numerals.

Figure 1:
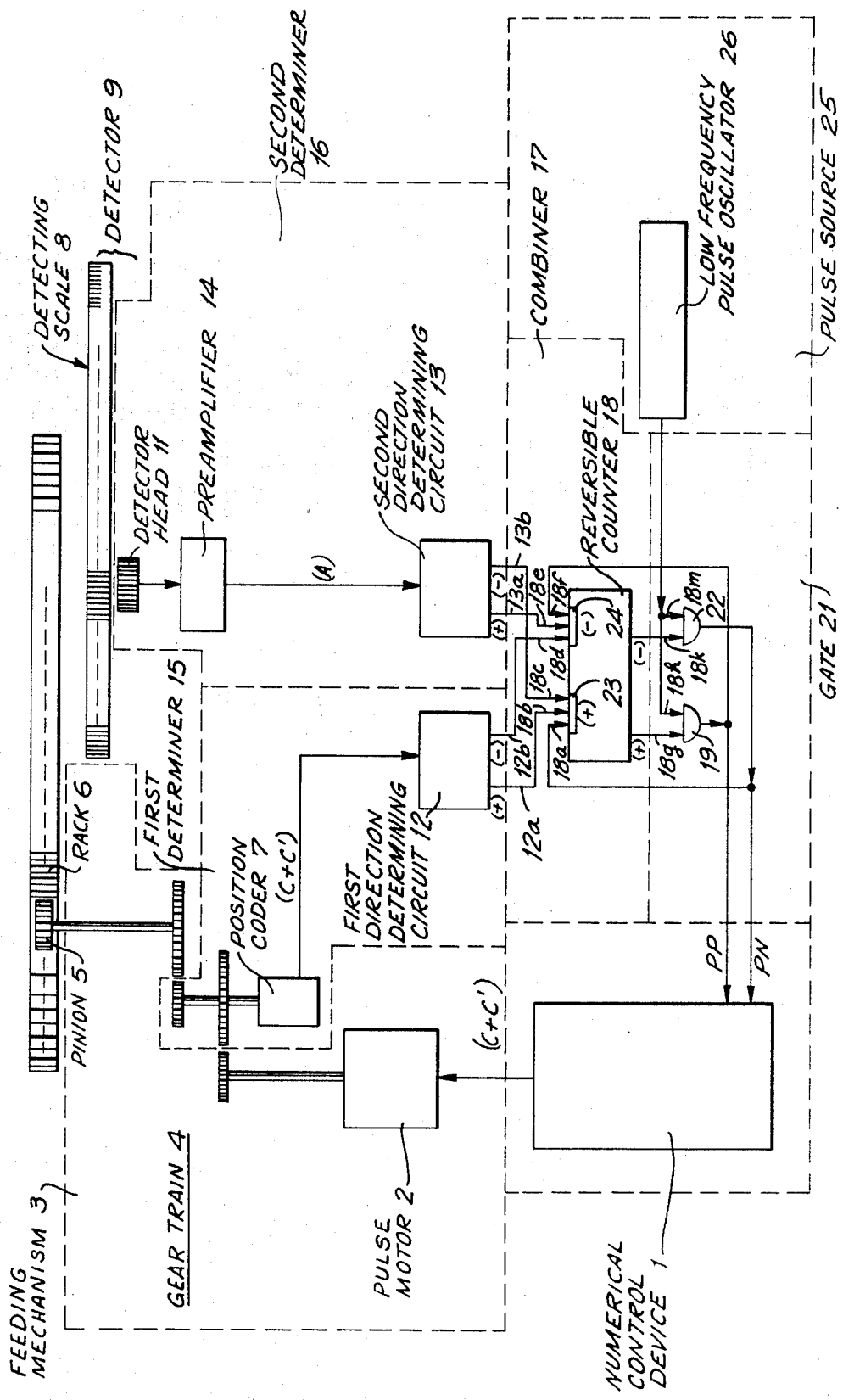
FIG. 1 is a block diagram of an embodiment of the numerical control system of the present invention.

In FIG. 1, a numerical control device 1 may comprise any suitable known arrangement for supplying command pulses. The numerical control device 1 supplies command pulses to a pulse motor 2. The pulse motor 2 is rotated by an angle proportional to the number of pulses supplied thereto by the numerical control device 1 and moves the machine accordingly. The pulse motor 2 moves the machine via a feeding mechanism 3 which comprises a gear train 4, a pinion 5 and a rack 6. The described components of the numerical control system of FIG. 1 constitute a numerical control system of open loop type.

A position coder 7 of any suitable type is coupled to the gear train 4 and functions as a first pulse generator. The position coder 7 may comprise, for example, a photoelectric device. The position coder 7, as is well known, generates determining signals of two phases, thereby enabling the determination of the direction as well as the magnitude of rotation of the feeding mechanism 3. A second pulse generator determines magnitude and direction of movement of the machine and supplies such determination in the form of a pulse train. The second pulse generator comprises a detecting scale 8 mounted on the fixed part of the machine and a detector 9 having a detector head 11 mounted on the movable part of the machine.

The detector 9 may comprise any suitable arrangement such as, for example, a linear inductosyn, and generates determining signals of two phases, similarly to the position coder 7, which determining signals indicate the direction of movement of the machine. The determining signals provided by the position coder 7 are supplied to a first direction determining circuit 12 and the determining signals provided by the detector 9, and more particularly, by the detector head 11 of said detector, are supplied to a second direction determining circuit 13 via a preamplifier 14. The first and second direction determining circuits 12 and 13 determine the direction of movement of the feeding mechanism 3 and the machine, respectively. The first direction determining circuit 12 has two output leads 12a and 12b and the second direction determining circuit 13 has two output leads 13a and 13b.

The position coder 7 and the first direction determining circuit 12 constitute a first determiner 15. The detector head 11, the preamplifier 14 and the second direction determining circuit 13 constitute a second determiner 16. A combiner 17 comprises a reversible counter 18 having a plurality of input leads 18a, 18b, 18c, 18d, 18e and 18f and a plurality of output leads 18g, 18h, 18k and 18m. The output lead 12a of the first direction determining circuit 12 is connected directly to the input lead 18b of the reversible counter 18. The output lead 12b of the first direction determining circuit 12 is directly connected to the input lead 18d of the reversible counter 18.

The output lead 13a of the second direction determining circuit 13 is directly connected to the input lead 18e of the reversible counter 18. The output lead 13b of the second direction determining circuit 13 is directly connected to the input lead 18c of the reversible counter 18. The output lead 18g of the reversible counter 18 is connected to one input of an AND or coincidence gate 19 of a gate 21. The output lead 18k of the reversible counter 18 is connected to an input of an AND or coincidence gate 22 of the gate 21.

If the machine is supplied with an input fed in a positive direction, the direction of a pulse from the first pulse generator or position coder 7 is determined by the first direction determining circuit 12 and said first direction determining circuit provides a pulse at its positive output lead 12a. If the machine is supplied with an input fed in a positive direction, the direction of a pulse from the second pulse generator or detector 9 is determined by the second direction determining circuit 13 and said second direction determining circuit provides a pulse at its positive output lead 13a. If the machine is supplied with an input fed in a negative direction, the direction of a pulse from the first pulse generator or position coder 7 is determined by the first direction determining circuit 12 and said first direction determining circuit provides a pulse at its negative output lead 12b. If the machine is supplied with an input fed in a negative direction, the direction of a pulse from the second pulse generator or detector 9 is determined by the second direction determining circuit 13 and said second direction determining circuit provides a pulse at its negative output lead 13b.

The reversible counter 18, which functions as the combiner 17, has a positive input terminal 23 and a negative input terminal 24. Each of the input leads 18a, 18b and 18c is connected to the positive input terminal 23 and each of the input leads 18d, 18e and 18f is connected to the negative input terminal 24. Each time a pulse is supplied to the positive input terminal 23 via any of the input leads 18a, 18b and 18c, a 1 is added to the count of the counter 18. Each time a pulse is supplied to the negative input terminal 24 via any of the input leads 18d, 18e and 18f, a 1 is subtracted from the count of the counter 18. The reversible counter 18 determines whether its count or content is positive or negative. If the count of the counter 18 is positive, a signal is provided at its positive output lead 18g. If the count of the counter 18 is negative, a signal is provided at its negative output lead 18k. The determination is performed with facility due to the determination of the logical values of bits in the counter.

A pulse source 25 comprises a low frequency pulse oscillator 26 having an output connected in common to each of the inputs 18h and 18m of the AND gates 19 and 22, respectively. The low frequency pulse oscillator 26 provides a compensating pulse which is transferred by the AND gates 19 and 22 under the control of the reversible counter 18. Thus, when there is a signal in the positive output lead 18g of the reversible counter 18, the AND gate 19 is switched to its conductive condition and transfers a compensating pulse from the low frequency pulse oscillator 26. When there is a signal in the negative output lead 18k of the reversible counter 18, the AND gate 22 is switched to its conductive condition and transfers a compensating pulse from the low frequency pulse oscillator 26.

A compensating pulse transferred by the AND gate 19 is supplied to the numerical control device 1 as a positive compensating pulse PP, is mixed in said numerical control device with the command pulse, and rotates the pulse motor 2 by an angle corresponding to a single pulse in the positive direction, thereby moving the machine a corresponding amount in the positive direction. A compensating pulse transferred by the AND gate 22 is supplied to the numerical control device 1 as a negative compensating pulse PN, is mixed in said numerical control device with the command pulse, and rotates the pulse motor 2 by an angle corresponding to a single pulse in the negative direction, thereby moving the machine a corresponding amount in the negative direction. The positive compensating pulse PP is also fed back to the reversible counter 18 via the input lead 18f. The negative compensating pulse PN is fed back to the reversible counter 18 via the input lead 18a.

Thus, when a positive compensating pulse PP is provided, it is mixed with the command pulse and is simultaneously supplied to the negative input terminal 24 of the reversible counter 18. When a negative compensating pulse PN is provided, it is mixed with the command pulse and is simultaneously supplied to the positive input terminal 23 of the reversible counter 18. For this reason, the reversible counter 18 always determines the difference between the magnitude of the input fed by the feeding mechanism to the machine, which is determined by the number of command pulses, and the magnitude of movement of said machine. The frequency of the low frequency pulse oscillator 26 must be slightly greater than the frequency of change of the difference between the magnitude of actual movement of the machine and the magnitude by which the machine is commanded to move, which latter magnitude corresponds to the command pulses by an amount corresponding to a single pulse when the machine is moved at the maximum feeding speed. This principle also applies to the hereinafter described embodiment of FIG. 3.

Figure 2:
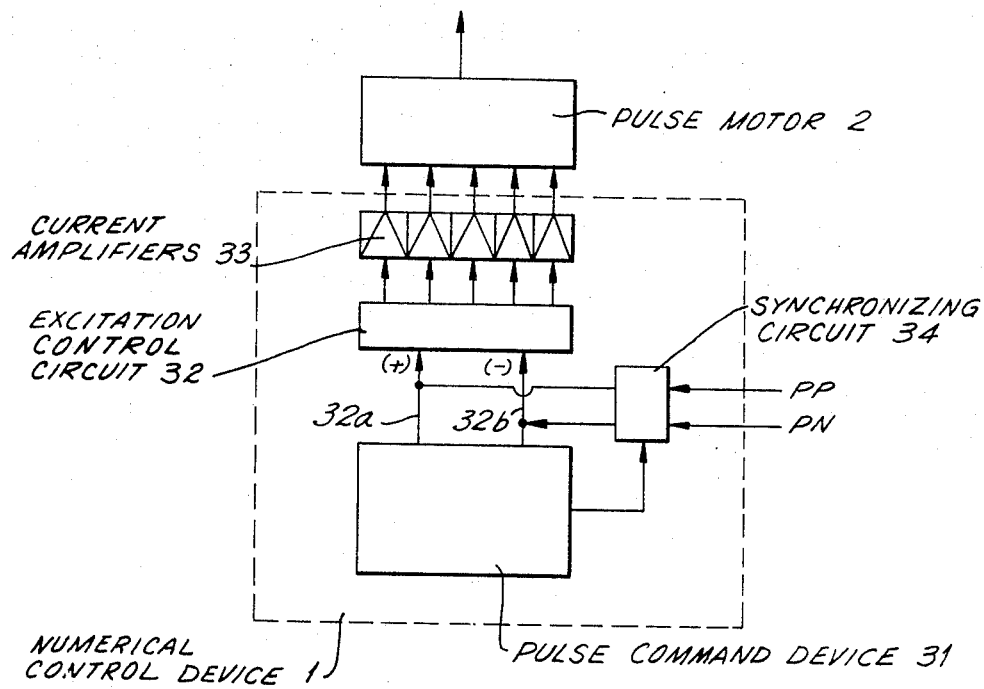
FIG. 2 is a block diagram of an embodiment of a circuit arrangement for mixing compensating pulses with command pulses.

FIG. 2 illustrates a circuit arrangement of the numerical control device 1 for mixing the compensating pulse with the command pulses. In FIG. 2, a pulse command device 31 comprises any suitable pulse interpolator or similar device for providing command pulses. The pulse command device 31 provides a pulse train and supplies said pulse train to the positive input lead 32a of an excitation control circuit 32 to rotate the pulse motor 2 in a positive direction. The pulse command device 31 provides a pulse train and supplies said pulse train to the negative input lead 32b of the excitation control circuit 32 to rotate the pulse motor 2 in a negative direction. The excitation control circuit 32 is connected to the pulse motor 2 via current amplifiers 33. The positive and negative compensating pulses PP and PN are supplied to the input leads 32a and 32b, respectively, via a synchronizing circuit 34. The pulse command device 31 is also connected and supplies a pulse train to the synchronizing circuit 34. The synchronizing circuit 34 functions to shift the command pulse from the compensating pulse so that said pulses do not overlap.

The excitation control circuit 32 functions to switch the excitation of the stator winding of the pulse motor 2. When a positive compensating pulse PP is supplied to the numerical control device 1, said pulse is supplied to the input lead 32a of the excitation control circuit 32 and is prevented by the synchronizing circuit 34 from overlapping the command pulse supplied to said excitation control circuit by the pulse command device 31. When a negative compensating pulse PN is supplied to the numerical device 1, said pulse is supplied to the input lead 32b of the excitation control circuit 32 and is prevented by the synchronizing circuit 34 from overlapping the command pulse supplied to said excitation control circuit by the pulse command device 31.

Each time a pulse is supplied to the excitation control circuit 32 via its positive input lead 32a, said excitation control circuit switches the excitation of the stator winding of the pulse motor 2 in a manner whereby said pulse motor is rotated one step in a positive direction. Each time a pulse is supplied to the excitation control circuit 32 via its negative input lead 32b, said excitation control circuit switches the excitation of the stator winding of the pulse motor 2 in a manner whereby said pulse motor is rotated one step in a negative direction.

In order to describe the operation of the embodiment of FIG. 1 of the present invention, it is assumed that C pulses are supplied to the pulse motor 2 as command pulses from the numerical control device 1 and the machine is moved in a positive direction. It is also assumed that the reduction ratio of the gear train 4 is determined in a manner whereby the machine is moved 1/100 mm per single pulse. When pulses are supplied to the pulse motor 2, said pulse motor rotates and moves the machine a distance corresponding to C pulses, that is, a distance equal to C/100 mm. Actually, the machine is not moved the distance C/100 mm exactly, due to pitch error. The first pulse generator or position coder 7 produces C pulses which are transferred via the first direction determining circuit 12 to the positive input terminal 23 of the reversible counter 18 and are counted by said counter.

While the machine is moving, a single pulse is generated by the second pulse generator or detector 9 each time said machine moves 1/100 mm. A second pulse generator provides A pulses, which are supplied via the second direction determining circuit 13 to the negative input terminal 24 of the reversible counter 18, where they are counted. Thus, if the magnitude of actual movement of the machine is greater than the magnitude of movement commanded by the command pulses by more than 1/100 mm, the count or contents of the reversible counter 18 becomes −1 or negative and switches the AND gate 22 of the gate 21 to its conductive condition. When the AND gate 22 is switched to its conductive condition, it transfers a negative compensating pulse PN to the numerical control device 1. The negative compensating pulse is supplied to the negative input lead 32b of the excitation control circuit 32 (FIG. 2) and the pulse motor 2 is rotated by an angle corresponding to a single pulse in a negative direction, so that said pulse motor moves the machine in the negative direction and compensates for the error. The negative compensating pulse PN is simultaneously supplied to the positive input terminal 23 of the reversible counter 18 via the input lead 18a, so that when a pulse is provided in each of the negative output leads 12b and 13b of the first and second direction determining circuits 12 and 13, respectively, due to the compensating operation, the count or contents of the reversible counter 18 becomes zero and the AND gate 22 is switched to its non-conductive condition.

On the other hand, if the magnitude of the actual movement of the machine decreases to more than 1/100 mm less than the magnitude of movement commanded by the command pulses, the count of the reversible counter 18 becomes positive or +1 and the AND gate 19 is switched to its conductive condition. The positive compensating pulse PP from the low frequency pulse oscillator 26 is thus transferred to the numerical control device 1 via the AND gate 19. The positive compensating device PP is supplied to the positive input lead 32a of the excitation control circuit 32 (FIG. 2) and rotates the pulse motor 2 in a positive direction to compensate for the error. The positive compensating pulse PP is also supplied to the negative input terminal 24 of the reversible counter 18, so that when a pulse is provided in each of the positive output leads 12a and 13a of the first and second direction determining circuits 12 and 13, respectively, due to the compensating operation, the count of the reversible counter 18 becomes zero and the AND gate 19 is switched to its conductive condition.

As hereinbefore described, in the embodiment of FIG. 1 of the numerical control system of the present invention, the difference between the magnitude of the input fed by the feeding mechanism to the machine in accordance with the command pulses and the magnitude of the actual movement of the machine is determined and a pulse from the low frequency pulse oscillator 26 is gated to the numerical control device 1 in accordance with the polarity or sign of the difference. This results in positive or negative compensation of extremely precise nature. Even if the count of the reversible counter 18 is changed from zero to a positive or negative count, a compensating pulse is not transferred immediately. A compensating pulse is provided only after a pulse is supplied from the low frequency pulse oscillator 26, so that the oscillation state is avoided and stable compensation is provided. It is obvious that any suitable magnetic scale or position coder may be utilized as either the first or second pulse generator, and it is possible to provide the zero region of the reversible counter 18 with width and switch the conductive condition of one of the gates, for example, when the absolute value of the count or contents of said reversible counter exceeds 2.

Figure 3:
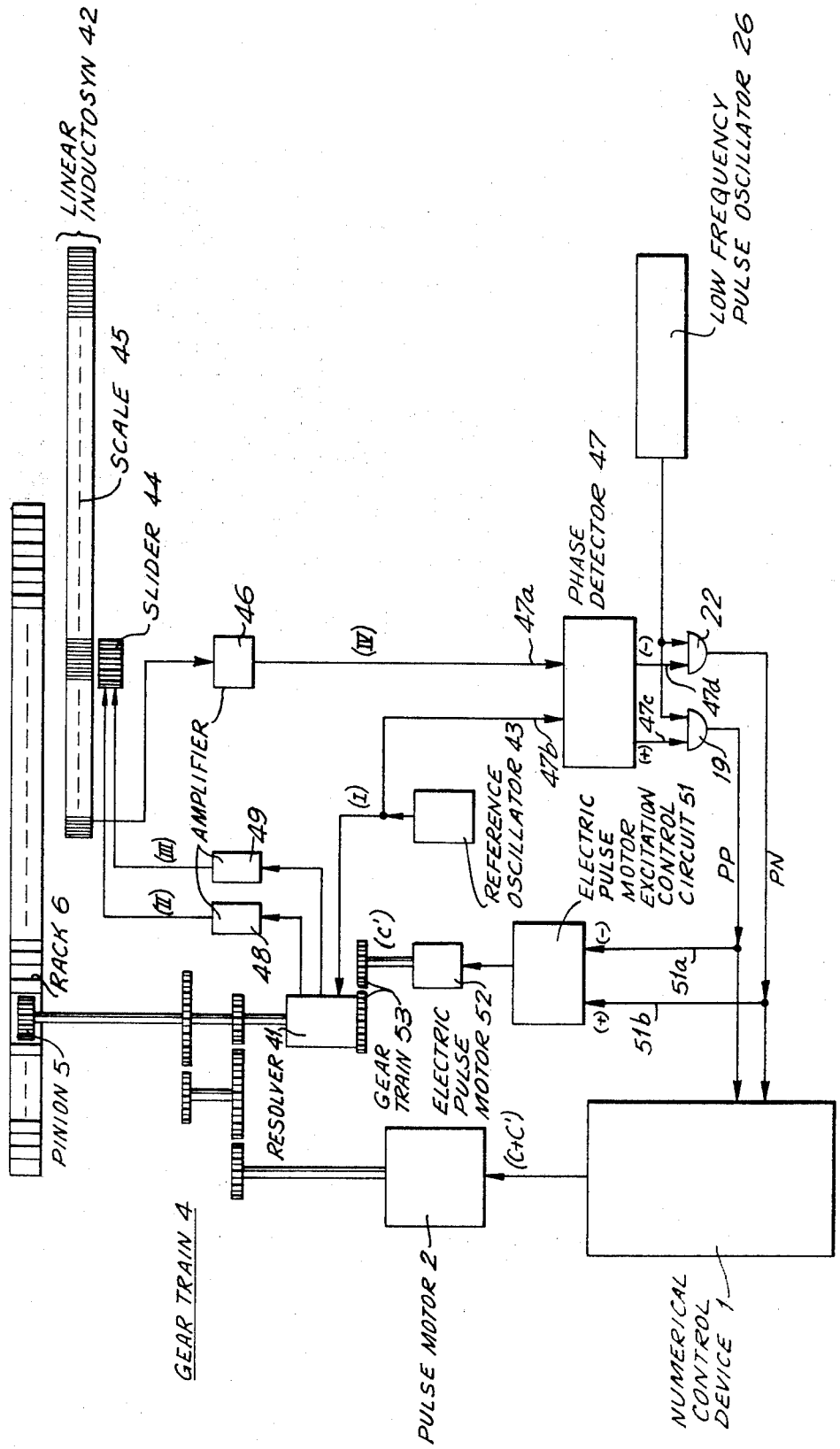
FIG. 3 is a block diagram of another embodiment of the numerical control system of the present invention.

FIG. 3 illustrates another embodiment of the numerical control system of the present invention. The embodiment of FIG. 3 is of open loop type. In FIG. 3, a resolver 41 and a linear inductosyn 42 are utilized to determine the difference between the magnitude of rotation of the feeding mechanism and the magnitude of actual movement of the machine. The stator winding of the resolver 41 is excited by a reference alternating signal from a reference oscillator 43. The rotor winding of the resolver 31 is rotated by the gear train 4. Two phase signals in the rotor winding of the resolver 41 are supplied to two phase windings of a slider 44 of the linear inductosyn 42.

The determination signal of a scale 45 of the linear inductosyn 42 is supplied via an amplifier 46 to an input lead 47a of a phase detector 47. The reference alternating signal is supplied to the phase detector 47 via its input lead 47b. When the angular displacement between the rotor and stator of the resolver 41 is $\alpha$, the angular displacement between the scale 45 and the slider 44 of the linear inductosyn 42 is $\beta$ and the reference alternating signal I is $A \sin \omega t$, the determination signal IV determined by said scale 45 may be expressed as $A \sin (\alpha - \beta) \sin \omega t$. The phase detector 47 may thus determine the polarity or sign of $(\alpha - \beta)$ by determining the phase of the determination signal IV. The phase detector 47 provides an output signal at one of its positive output lead 47c and its negative output lead 47d.

The resolver 41 is electrically connected to the slider 44 of the linear inductosyn 42 via amplifiers 48 and 49. The output lead 47c of the phase detector 47 is connected to one input of the AND gate 19. The output lead 47d of the phase detector 47 is connected to one input of the AND gate 22. The output of the low frequency pulse oscillator 26 is connected in common to the other input of the AND gate 19 and the other input of the AND gate 22. The AND gate 19 transfers the positive compensating pulse PP from the low frequency pulse oscillator 26 to the numerical control device 1. The AND gate 22 transfers the negative compensating pulse PN from the low frequency pulse oscillator 26 to the numerical control device 1.

The output lead of the AND gate 19 is also connected to a negative input lead 51a of an electric pulse motor excitation control circuit 51. The output lead of the AND gate 22 is also connected to the positive input lead 51b of the electric pulse motor excitation control circuit 51. The electric pulse motor excitation control circuit is connected to and controls the excitation of an electric pulse motor 52. The electric pulse motor 52 is coupled to and rotates the stator of the resolver 41 via a gear train 53.

In the embodiment of FIG. 3 of the numerical control system of the present invention, the positive compensating pulse PP or the negative compensating pulse PN is mixed with the command pulses in the numerical control device 1 and is simultaneously supplied to the electric pulse motor excitation control circuit 51 to control the excitation of the electric pulse motor 52 and thereby control the rotation of the stator of the resolver 41 relative to the rotor of said resolver. At such time, the angle of rotation of the stator of the resolver 41 for a single pulse is made equal to the angle of rotation of the rotor of said resolver for a single command pulse, and the direction of rotation of said stator is made equal to the direction of rotation of said rotor by the compensating pulse. The angular deviation between the rotor and stator of the resolver 41 thus remains equivalent and corresponds to the number of command pulses, regardless of whether the compensating pulse has been supplied to the pulse motor 2 or not. The determination signal IV from the scale 45 of the linear inductosyn 42 indicates the difference between the magnitude of the input rotation of the machine corresponding to the number of command pulses and the magnitude of the actual movement of the machine.

Figure 4:
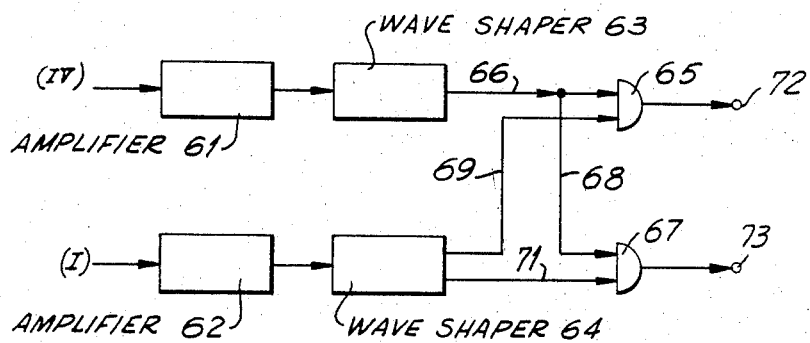
FIG. 4 is a block diagram of an embodiment of a phase detector which may be utilized as the phase detector of the embodiment of FIG. 3.
Figure 5:
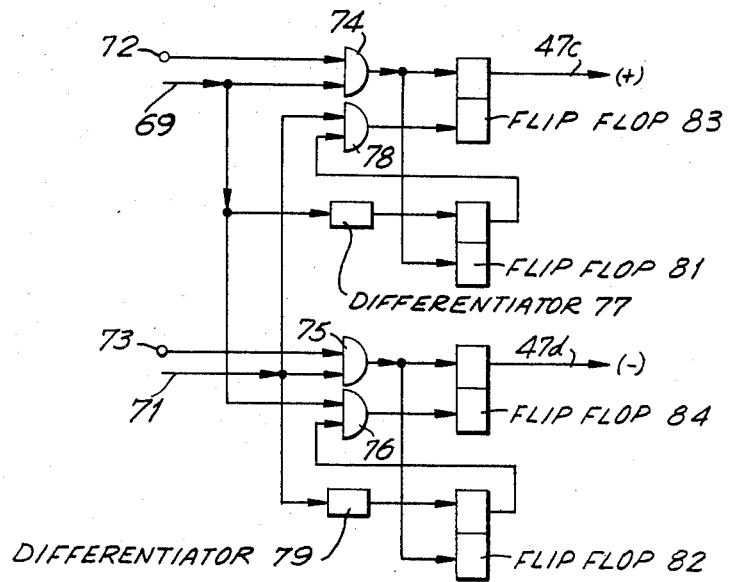
FIG. 5 is a block diagram of another embodiment of a phase detector which may be utilized as the phase detector of the embodiment of FIG. 3.

FIGS. 4 and 5 are block diagrams of phase detectors which may be utilized as the phase detector 47 of the embodiment of FIG. 3 of the present invention. In FIG. 4, the determination signal IV provided by the scale 45 of the linear inductosyn 42 is supplied to an amplifier 61 and the reference alternating signal I provided by the reference oscillator 43 is supplied to an amplifier 62. The output of the amplifier 61 is supplied to a wave shaper 63 and the output of the amplifier 62 is supplied to a wave shaper 64. Each of the wave shapers 63 and 64 functions to clip the alternating signals at a designated level and to convert the input sinusoidal waveform into a rectangular waveform.

In FIG. 4, the output of the wave shaper 63 is directly connected in common to an input of an AND gate 65 via a lead 66 and to an input of an AND gate 67 via the lead 66 and a lead 68. An output of the wave shaper 64 is connected to the other input of the AND gate 65 via a lead 69 and an output of said wave shaper is connected to the other input of the AND gate 67 via a lead 71. The output of the AND gate 65 is directly connected to an output terminal 72 and the output of the AND gate 67 is directly connected to an output terminal 73.

In FIG. 5, the output terminal 72 of FIG. 4 is directly connected to an input of an AND gate 74 and the output terminal 73 is directly connected to an input of an AND gate 75. The lead 69 of FIG. 4 is directly connected in common to the other input of the AND gate 74, to an input of an AND gate 76 and to the input of a differentiator 77. The lead 71 of FIG. 4 is directly connected in common to the other input of the AND gate 75, to an input of an AND gate 78 and to the input of the differentiator 79.

In FIG. 5, the output of the differentiator 77 is connected to the set input of a flip flop 81 and the output of the differentiator 79 is connected to the set input of a flip flop 82. The set output of the flip flop 81 is directly connected to the other input of the AND gate 78. The set output of the flip flop 82 is directly connected to the other input of the AND gate 76. The output of the AND gate 74 is directly connected in common to the set input of a flip flop 83 and to the reset input of the flip flop 81. The output of the AND gate 85 is directly connected in common to the set input of a flip flop 84 and to the reset input of the flip flop 82. The output of the AND gate 78 is directly connected to the reset input of the flip flop 83. The output of the AND gate 76 is directly connected to the reset input of the flip flop 84. The set output of the flip flop 83 is the positive output lead 47c of the phase detector 47 and the set output of the flip flop 48 is the negative output lead 47d of said phase detector (FIG. 3).

Figure 6A:
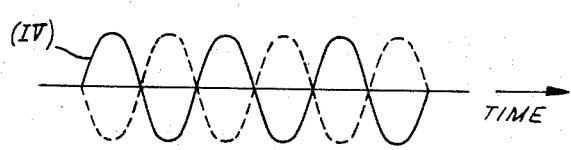
FIGS. 6a, 6b, 6c, 6d, 6e and 6f are graphical presentations of waveforms appearing in various parts of the embodiment of FIG. 4.
Figure 6B:
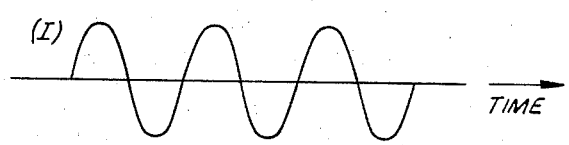
Figure 6C:
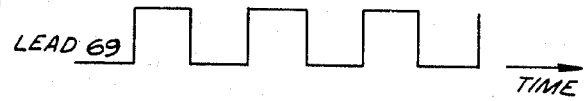
Figure 6D:
Figure 6E:
Figure 6F:
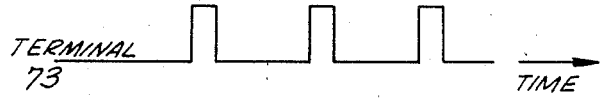

The waveforms appearing in FIG. 4 are illustrated in FIGS. 6a to 6f. It is assumed that the angular displacement $\alpha$ of the resolver 41 is different from the angular displacement $\beta$ of the linear inductosyn 42 and that the relation between $\alpha$ and $\beta$ may be expressed as $\alpha - \beta > 0$. The phase of the determination signal IV provided by the inductosyn 42 thus becomes equal to the phase of the reference signal I provided by the reference oscillator 43 (FIG. 3), as shown in FIGS. 6a and 6b. FIG. 6a illustrates the determination signal IV and FIG. 6b illustrates the reference signal I. FIG. 6c illustrates the waveform of the signal in the lead 69 of FIG. 4. FIG. 6d illustrates the waveform of the signal in the lead 71 of FIG. 4. FIG. 6e illustrates the waveform of the signal at the terminal 72 of FIG. 4. FIG. 6f illustrates the waveform of the signal at the terminal 73 of FIG. 4.

The waveforms of FIGS. 6c and 6d appearing in the leads 69 and 71, respectively, provide the waveforms of FIGS. 6e and 6f, respectively, at the output terminals 72 and 73, respectively. The signals at the terminal 72 (FIGS. 4 and 5) set the flip flop 83 so that said flip flop provides an output signal in the lead 47c. If the determination signals IV no longer appear, the flip flop 83 is reset via the AND gate 78 due to signals in the lead 71. The flip flop 81 is set upon an increase in the signals in the lead 69. The output signals in the lead 47c thus terminate.

On the other hand, when the relationship between $\alpha$ and $\beta$ may be expressed as $\alpha - \beta \leq 0$, the determination signal IV, as shown by the broken line in FIG. 6a, has a phase difference of 180° relative to the reference signal I (FIG. 6b). In this case, a signal having the waveform of FIG. 6f is provided at the terminal 73 of FIG. 4. Consequently, the flip flop 84 of FIG. 5 is set and provides an output signal in the output lead 47d. If the determination signal is terminated, the flip flop 84 of FIG. 5 is reset by signals in the lead 69 via the AND gate 55. The flip flop 82 is set upon an increase in the signals in the lead 71 and provides an output signal. Signals in the lead 47d consequently are terminated.

In the embodiment of FIG. 3, the scale 45 is mounted on the fixed part of the machine and the slider 45 is mounted on the movable part of the machine. It is, of course, possible to mount the slider on the fixed part of the machine and to mount the scale on the movable part of the machine. Furthermore, a resolver may be utilized to determine the movement of the machine. In such case, a rack may be mounted on the fixed part of the machine and the resolver may be mounted on the movable part of the machine. A pinion mounted on the rotor of the resolver may then be provided in engagement with the rack.

In explaining the operation of the embodiment of FIG. 3 of the present invention, it is assumed that command pulses are supplied to the positive input of the pulse motor 2 to move the machine in a positive direction. The rotor of the resolver 41 is rotated by an angle corresponding to the number C of command pulses and provides signals c which correspond in number to the command pulses. On the other hand, when signals A corresponding to the magnitude of actual movement of the machine in the positive direction are provided, the scale 45 of the linear inductosyn 42 provides signals corresponding to (c−A).

If (c−A) is positive, which indicates that the magnitude of actual movement of the machine is less than the command data, a signal is provided at the positive output lead 47c of the phase detector 47. A positive compensating pulse PP is thus transferred from the low frequency pulse oscillator 26 to the numerical control device 1 via the AND gate 19. The positive compensating pulse PP is, as in the embodiment of FIG. 1 of the present invention, supplied to the pulse motor 2 and rotates said motor in the positive direction. The pulse motor 2 then moves the machine by a distance corresponding to one pulse in the positive direction. The difference between the command data and the actual movement of the machine is thereby compensated.

When a positive compensating pulse PP is provided, it is also supplied to the negative input lead 51a of the electric pulse motor excitation control circuit 51. The electric pulse motor excitation control circuit 51 excites the electric pulse motor 52 in a manner whereby said electric pulse motor rotates the stator of the resolver 41 by a specific angle. As a result, rotation of the rotor of the resolver 41 due to the compensating pulse is terminated and only the relationship between the position of the scale 45 and the position of the slider 44 of the inductosyn 42 is changed, so that determination signals IV provided by said inductosyn are decreased. The zero region in the phase detector 47 may be adjusted as desired by varying the designated magnitude of the trigger level of the wave shaping circuit of FIG. 4.

Figure 7:
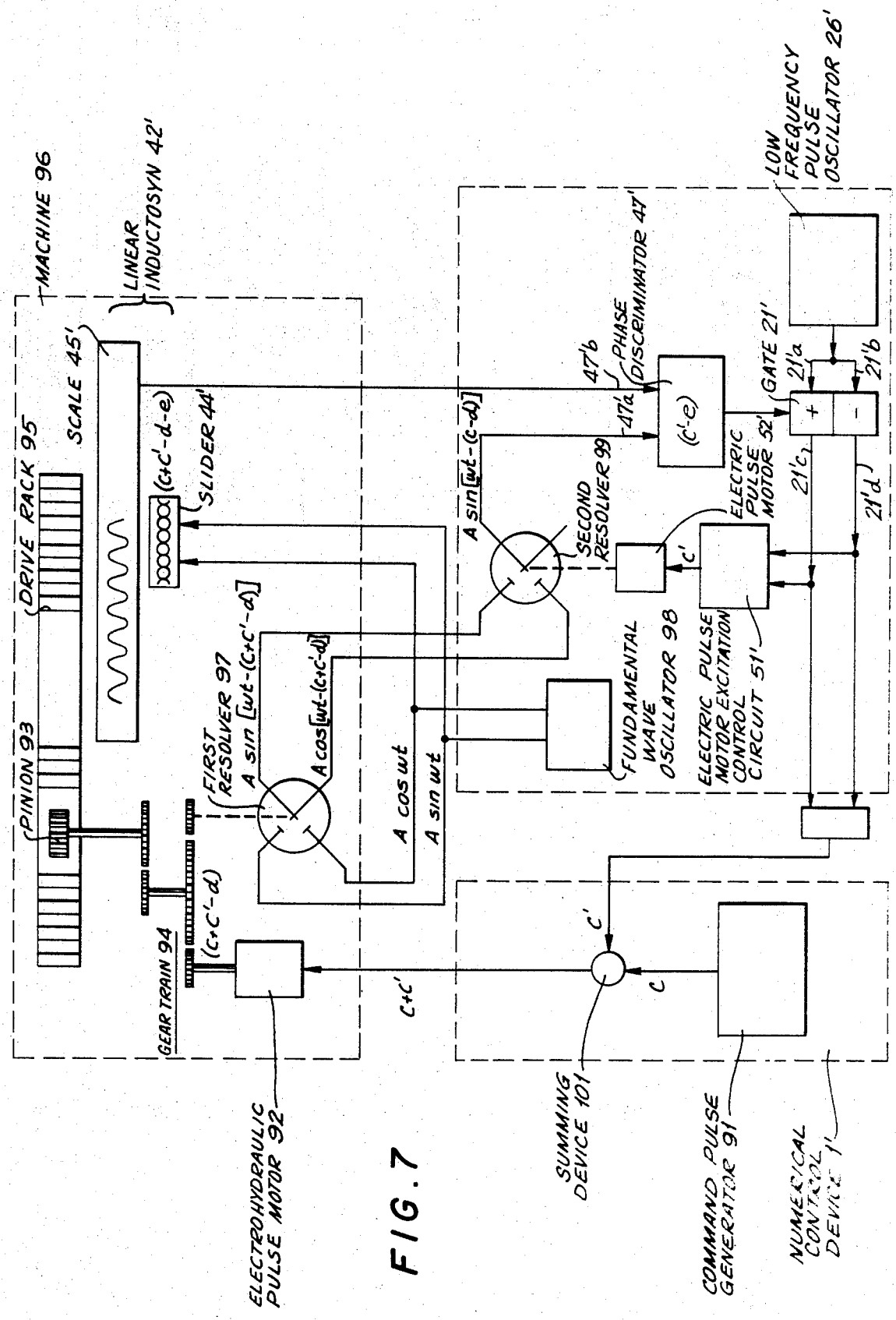
FIG. 7 is a block diagram of still another embodiment of the numerical control system of the present invention.

FIG. 7 illustrates a third embodiment of the numerical control system of the present invention. The embodiment of FIG. 7 is a modification of the embodiment of FIG. 3 of the present invention. In FIG. 7, the numerical control device 1' includes a command pulse generator 91 which functions to provide command pulses C. The command pulse generator 91 is connected to an electrohydraulic pulse motor 92. The electrohydraulic pulse motor 92 is rotated in either a positive or a negative direction by command pulses and compensating pulses and is driven by any suitable pulse motor driving circuit (not shown in FIG. 7).

The output shaft of the electrohydraulic pulse motor 92 is coupled to a pinion 93 via a gear train 94. The pinion 93 engages the drive rack 95 of the machine 96, so that said machine is movable in the longitudinal direction of said drive rack by rotation of the electrohydraulic pulse motor 92. The gear train 94 is also coupled to a first resolver 97. Rotation of the electrohydraulic pulse motor 92 rotates the rotor of the first resolver 97. The machine 96 includes the linear inductosyn 42', which inductosyn comprises the scale 45' and the slider 44'. A fundamental wave oscillator 98 is connected to, and functions to excite, two stator windings of the first resolver 97. The fundamental wave oscillator 98 is also connected to, and functions to excite, two windings of the slider 44' of the inductosyn 42'.

Two output windings of the rotor of the first resolver 97 are directly connected to corresponding stator windings of a second resolver 99. One of the two windings of the rotor of the second resolver 99 is directly connected to an input lead 47'a of a phase discriminator 47'. A winding of the scale 45' of the inductosyn 42' is directly connected to another input lead 47'b of the phase discriminator 47'. A gate 21' has a control input directly connected to the output 47'c of the phase discriminator 47'. A low frequency oscillator 26' is directly connected to both inputs 21'a and 21'b of the gate 21'. The gate may comprise, for example, a bistable multivibrator or flip flop.

The gate 21' is switched from one stable state to another, to provide a positive or negative signal, in accordance with the output signal of the phase discriminator 47'. The low frequency pulse oscillator 26' provides a compensating pulse to the set output lead 21'c or the reset output lead 21'd of the gate 21'. The output leads 21'c and 21'd are connected to an electric pulse motor 52' via an electric pulse motor excitation control circuit 51' in the manner of the embodiment of FIG. 3. The output shaft of the electric pulse motor is coupled to the rotor of the second resolver 99. Thus, each time a compensating pulse is provided, the electric pulse motor 52' is rotated and rotates the rotor of the second resolver 99. A compensating pulse C' in the output lead 21c or in the output lead 21d is supplied to a summing device 101 of the numerical control device 1' where it is mixed with the command pulses C.

In order to explain the operation of the embodiment of FIG. 7 of the present invention, it is assumed that the angle of rotation of the rotor of the first resolver 97 for a single pulse is equal to the angle of rotation of the rotor of the second resolver 99 for a single pulse. If command pulses C are provided by the command pulse generator 91 and a compensating pulse C' is mixed with the command pulses, the combined pulses $C+C'$ are supplied to the electrohydraulic pulse motor 92. As a result, the electrohydraulic pulse motor 92 is rotated by an angle corresponding to $C+C'-d$, where d is the deviation of said pulse motor.

The fundamental wave oscillator 98 supplies in advance the fundamental waves $A \sin \omega t$ and $A \cos \omega t$ to two sets of terminals of the stator of the first resolver 97. When the rotor of the first resolver 97 is rotated by an angle corresponding to $C + C' - d$, the rotor windings of said first resolver provide output signals $A \sin [\omega t - (C+C'-d)]$ and $A \cos [\omega t - (C+C'-d)]$.

The machine is actually moved a distance corresponding to $C+C'-d-e$, where e is the error of the machine. The output of the scale 45' thus becomes $$A \sin [\omega t - (C+C'-d-e)]$$

and the output of the second resolver 82 becomes $$A \sin [\omega t - (C-d)]$$

The phase difference $(C'-e)$ between the two outputs is thus determined by the phase discriminator 47. The gate 21 is controlled in accordance with the difference in phase between the two outputs and provides a compensating pulse. The electric pulse motor 52' is rotated under the control of the compensating pulse and said motor rotates the rotor of the second resolver 99 in a direction which decreases the absolute magnitude of $(C'-e)$.

As hereinbefore described, in the numerical control system of the present invention, a signal corresponding to the difference between the magnitude of the drive of the feeding mechanism which feeds the machine and the magnitude of the actual movement of the machine is provided. The signal controls the transfer of a compensating pulse from a low frequency pulse oscillator to a numerical control device in accordance with its polarity or sign. This prevents the numerical control system from falling into an oscillation state and provides stable compensation.

Figure 8:
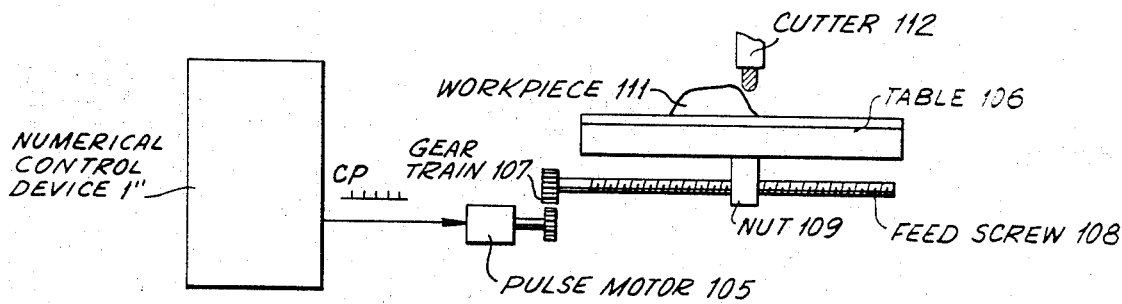
FIGS. 8, 9 and 10 are schematic diagrams of different types of numerical control systems in which the numerical control system of the present invention may be utilized.

FIG. 8 illustrates a known numerical control system of open loop type to which the numerical control system of the present invention may be applied. Command pulses CP are supplied by a numerical control device 1'' to a pulse motor 105. The pulse motor 105 is coupled to a table 106 of the machine via a gear train 107, a feed screw 108 and a nut 109, and moves said table. A workpiece 111 is supported on the table 106 in operative proximity with a machine tool or cutter 112 of the machine. There is no feedback loop in the open loop type of numerical control system, as shown in FIG. 8.

Figure 9:
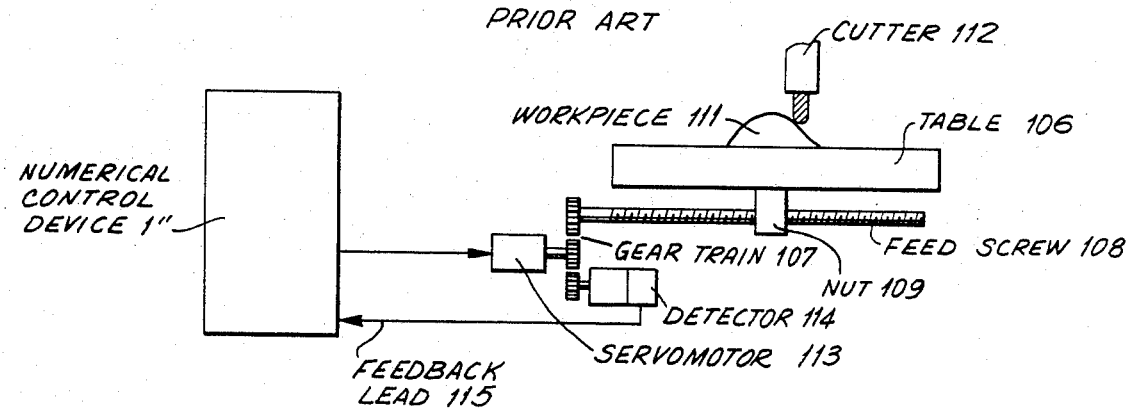

FIG. 9 illustrates a known numerical control system of semi-closed loop type to which the numerical control system of the present invention may be applied. A servomotor 113 is coupled to the feed screw 108 via the gear train 107. The amount of rotation of the servomotor 113 is determined by a detector 114 coupled thereto and is fed back to the numerical control device 1'' via a feedback lead 115.

Figure 10:
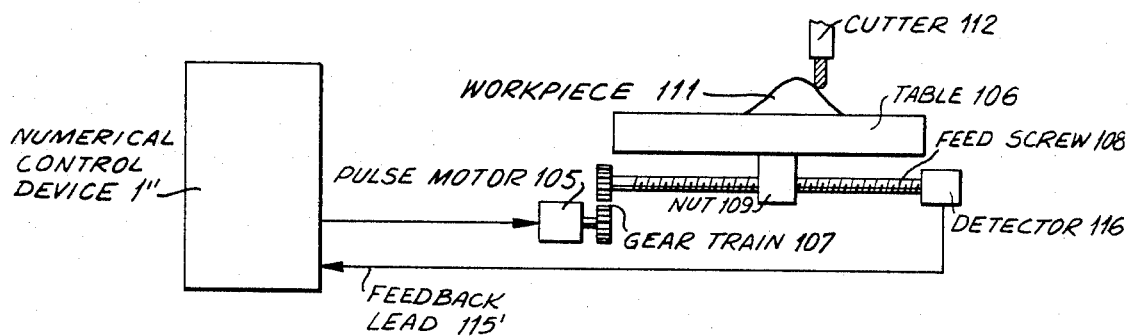

FIG. 10 illustrates another known numerical control system of semi-closed loop type to which the numerical control system of the present invention may be applied. A detector 116 is coupled to the feed screw 108 and determines the amount of rotation of said feed screw. The detector 116 is electrically connected to the numerical control device 1'' via a feedback lead 115' and feeds back a signal indicating the amount of rotation of the feed screw 108.

While the invention has been described by means of specific examples and in specific embodiments, we do not wish to be limited thereto, for obvious modifications will occur to those skilled in the art without departing from the spirit and scope of the invention.

We claim:

1. A numerical control system for eliminating error in a feeding mechanism for a movable part of a machine, said system comprising
   numerical control means coupled to said feeding mechanism for controlling the operation thereof;
   first detecting means coupled to said feeding mechanism for detecting the magnitude of displacement fed by said feeding mechanism to said machine;
   second detecting means mounted on said movable part for detecting the magnitude of the resultant displacement of said movable part along an axis;
   pulse generating means for providing pulses at a predetermined low frequency;
   combining means connected to said first and second detecting means for comparing the detected magnitudes thereof; and
   gate means having inputs connected to said pulse generating means, inputs connected to said combining means and outputs connected to said numerical control means for supplying a compensating pulse from said pulse generating means to said numerical control means in accordance with the detected magnitudes of said first and second detecting means.

2. A numerical control system as claimed in claim 1, wherein said combining means comprises means for detecting the difference between the magnitude of the displacement to the feeding mechanism and the magnitude of the resultant displacement of said movable part and indicating which is greater.

3. A numerical control system as claimed in claim 1, wherein said numerical control means includes positive compensation means for compensating said feeding mechanism in one direction and negative compensation means for compensating said feeding mechanism in the opposite direction and wherein said combining means comprises means for detecting the difference between the magnitude of the displacement to the feeding mechanism and the magnitude of the resultant displacement of said movable part and indicating which is greater and controls said gate means to supply a pulse to the positive compensation means of said numerical control means when one of said magnitudes is greater than the other and to the negative compensation means of said numerical control means when said other of said magnitudes is greater than said one of said magnitudes.

4. A numerical control system as claimed in claim 1, wherein the magnitude detected by each of said first and second detecting means includes direction.

5. A numerical control system as claimed in claim 3, wherein said combining means comprises a reversible counter and said gate means comprises coincidence gate means.

6. A numerical control system as claimed in claim 3, wherein said first detecting means comprises resolver means, said second detecting means comprises linear inductosyn means, said combining means comprises phase detecting means and said gate means comprises bistable multivibrator means.

* * * * *